(12) United States Patent
Martin et al.

(10) Patent No.: US 8,127,571 B2
(45) Date of Patent: Mar. 6, 2012

(54) METHOD OF REFINING A LITHIUM ALUMINOSILICATE GLASS AND GLASS-CERAMIC OBTAINED

(75) Inventors: Dorothee Martin, Suresnes (FR); Yannick Lefrere, Malakoff (FR)

(73) Assignee: Eurokera S.N.C., Chateau-Thierry (FR)

( * ) Notice: Subject to any disclaimer, the term of this patent is extended or adjusted under 35 U.S.C. 154(b) by 0 days.

(21) Appl. No.: 12/447,300

(22) PCT Filed: Oct. 25, 2007

(86) PCT No.: PCT/FR2007/052246
§ 371 (c)(1),
(2), (4) Date: Jun. 3, 2009

(87) PCT Pub. No.: WO2008/053110
PCT Pub. Date: May 8, 2008

(65) Prior Publication Data
US 2010/0069219 A1    Mar. 18, 2010

(30) Foreign Application Priority Data

Oct. 27, 2006 (FR) ..................................... 06 54585
Apr. 25, 2007 (FR) ..................................... 07 54691

(51) Int. Cl.
*C03B 5/225* (2006.01)
*C03C 3/083* (2006.01)
*C03C 10/12* (2006.01)

(52) U.S. Cl. .............. 65/134.1; 65/134.9; 501/4; 501/7; 501/68; 501/69

(58) Field of Classification Search ................. 501/4, 7, 501/68, 69; 65/134.1, 134.9
See application file for complete search history.

(56) References Cited

U.S. PATENT DOCUMENTS

| 3,511,629 A | 5/1970 | Bauer et al. |
| 3,788,865 A * | 1/1974 | Babcock et al. ................... 501/7 |
| 4,285,728 A * | 8/1981 | Babcock et al. ................... 501/7 |
| 5,064,461 A * | 11/1991 | Morena et al. ................. 65/33.3 |
| 5,069,826 A | 12/1991 | Cheng |
| 6,413,892 B1 * | 7/2002 | Koyama et al. ................. 501/64 |
| 7,727,917 B2 * | 6/2010 | Shelestak et al. ............... 501/69 |
| 2005/0090377 A1 * | 4/2005 | Shelestak et al. ............... 501/69 |
| 2008/0269039 A1 | 10/2008 | Joubaud et al. |
| 2010/0130341 A1 * | 5/2010 | Wondraczek ..................... 501/4 |

FOREIGN PATENT DOCUMENTS

| DE | 199 39 787 A1 | | 2/2001 |
| EP | 285243 | * | 10/1988 |
| EP | 592237 | * | 4/1994 |
| FR | 2 657 079 | | 7/1991 |
| FR | 2928145 | * | 9/2009 |
| NL | 6 605 388 | | 10/1967 |

* cited by examiner

*Primary Examiner* — Karl Group

(74) *Attorney, Agent, or Firm* — Oblon, Spivak, McClelland, Maier & Neustadt, L.L.P.

(57) ABSTRACT

The present invention relates to a method of refining lithium aluminosilicate glass capable of being controllably ceramized and free of arsenic oxide, antimony oxide and tin oxide, in which at least 0.05% by weight of at least one sulfide is added to the glass batch materials and said materials are melted at a temperature below 1750° C. The invention also relates to the glass-ceramics obtained from said colored glass, especially glass colored by vanadium oxide, and cooktops and cooking utensils including such glass-ceramics.

11 Claims, No Drawings

METHOD OF REFINING A LITHIUM ALUMINOSILICATE GLASS AND GLASS-CERAMIC OBTAINED

The invention relates to the field of glass-ceramics.

It relates more precisely to a method of refining a lithium aluminosilicate glass from which, by an appropriate heat treatment, it is possible to obtain glass-ceramics.

Such glass-ceramics are especially intended to be used as kitchen articles, in particular as cooktops covering heating elements, such as halogen or radiant heating elements, or cooking utensils.

If lithium aluminosilicate glass-ceramics prove to be very suitable for these uses, it is thanks to their esthetic appearance, which can to a large extent be varied, to their mechanical properties, especially their high impact strength owing to their low thermal expansion coefficient within the range of temperatures at which they are used, and to their chemical properties, namely resistance to both acids and bases.

Glass-ceramics also possess specific optical properties that depend on their use. Thus, in the case of a cooktop, it is important for the glass-ceramic to have a low light transmission capability so that the user is unable, or only with difficulty, to distinguish the underlying heating elements when they are not operating. However, at the same time, the cooktop must allow the elements to be seen when they are heating, without however dazzling the user, so as to reduce the risk of them being burnt on contact with the hot plate. The glass-ceramic must also have good energy transmission properties, in particular for transmitting the infrared radiation produced by the heating elements in order to bring the food to the desired temperature in as short a time as possible.

Conventionally, the production of glass-ceramics takes place in several steps: a) melting of the glass batch materials containing at least one nucleating agent; b) forming and cooling of the glass down to a temperature lower than its conversion range; and c) heat treatment to ceramize the glass.

During step a), it is necessary to refine the glass so as to remove the gas bubbles generated by melting the batch materials and to avoid the presence of incompletely melted residual particles (called "stones") coming from these materials. The presence of bubbles and stones is prejudicial to the mechanical properties of the final glass-ceramic.

It is well known that arsenic oxide and antimony oxide are effective refining agents for producing glass-ceramics (see EP-A-437 228 and U.S. Pat. No. 3,788,865). These oxides are advantageous as they do not significantly modify the thermal expansion coefficient of the glass and do not increase the rate of nucleation of β-quartz during ceramization step c).

However, arsenic and antimony oxides have drawbacks.

At the temperatures at which refining takes place (generally between 1400 and 1700° C.), arsenic and antimony oxides have a high volatility and consequently their use must be strictly controlled in order not to damage the health of the operators and to prevent these compounds from being discharged into the atmosphere.

Furthermore, the glass treated with these refining agents cannot be converted into ribbon using the conventional process of floating the glass on a bath of molten metal, especially tin, since a film of arsenic or antimony forms on the surface of the glass, which film significantly reduces the optical properties of the glass.

Other refining agents have been proposed as replacement for arsenic and antimony oxides.

In EP-A-156479, it is proposed to introduced 0.2 to 2% cerium oxide or cerates into lithium aluminosilicate glass compositions. The glass-ceramics obtained have a coloration ranging from amber to dark brown depending on the nature of the colorants added to the glass composition.

In JP-A-11100229 and JP-A-11100230, a colored glass-ceramic is obtained by adding 0.1 to 2% tin oxide to a glass composition containing 0.01 to 0.5% vanadium oxide.

WO-A-02/16279 describes the production of a transparent glass-ceramic colored by vanadium oxide, using tin oxide, cerium oxide and a sulfate or chloride as refining agent.

In US-A-2002/0023463, colorless or colored glass-ceramics are refined by the addition of 0.2 to 0.6% tin oxide.

It has been found that the level of refining of the glass obtained with the aforementioned oxides substituting for arsenic oxide and antimony oxide is insufficient and has to be improved.

One object of the present invention is to provide a method of refining a lithium aluminosilicate glass that allows a high level of refining to be achieved without recourse to the conventional refining agents, such as arsenic oxide, antimony oxide and tin oxide, and that allows the glass to be produced by float process on a bath of molten metal.

Another object of the invention is to provide a glass that can be converted into a glass-ceramic, especially a colored glass, in particular by vanadium oxide, for the production of cooktops having a low transmission in the visible and a high transmission in the infrared.

These objects are achieved according to the invention thanks to a method of refining lithium aluminosilicate glass capable of being controllably ceramized and free of arsenic oxide, antimony oxide and tin oxide, in which at least 0.05% by weight of at least one sulfide is added to the glass batch materials and said materials are melted at a temperature below 1750° C.

The sulfide acts as glass refining agent. The sulfide is chosen from metal sulfides, such as transition metal sulfides, for example zinc sulfide, iron sulfide and silver sulfide, alkali metal sulfides, for example potassium sulfide, sodium sulfide and lithium sulfide, alkaline-earth metal sulfides, for example calcium sulfide, barium sulfide, magnesium sulfide and strontium sulfide, compounds capable of generating sulfides under the melting conditions and mixtures of the aforementioned sulfides and/or compounds. The preferred sulfides are zinc sulfide, lithium sulfide, barium sulfide, magnesium sulfide and strontium sulfide. Zinc sulfide proves to be particularly advantageous.

The sulfide may also be introduced into the glass batch materials in the form of a slag or a sulfide-enriched glass frit, which has the advantage of increasing the rate of digestion of stones and improving both the chemical homogeneity and the optical quality of the glass. However, it is well known that slags also contain iron in a substantial amount, which reduces the infrared transmission. From this standpoint, it is preferable to use glass frits whose chemical composition, especially its iron content, can be perfectly controlled.

Preferably, the sulfide is added to the glass batch materials in an amount of less than 2%, advantageously less than 1% and better still between 0.07 and 0.8% of the total weight of the glass batch materials.

Advantageously, coke or a carbonaceous compound is added to the glass batch materials.

Preferably, the melting point of the batch materials does not exceed 1700° C., but is advantageously above 1600° C.

As is conventional, the term "lithium aluminosilicate glass" is understood to mean a glass that comprises the following constituents within the limits defined below, which are expressed in percentages by weight:

| | |
|---|---|
| SiO$_2$ | 52-75% |
| Al$_2$O$_3$ | 18-27% |
| Li$_2$O | 2.5-5.5% |
| K$_2$O | 0-3% |
| Na$_2$O | 0-3% |
| ZnO | 0-3.5% |
| MgO | 0-3% |
| CaO | 0-2.5% |
| BaO | 0-3.5% |
| SrO | 0-2% |
| TiO$_2$ | 1.2-5.5% |
| ZrO$_2$ | 0-3% |
| P$_2$O$_5$ | 0-8%. |

This glass may contain up to 1% by weight of nonessential constituents that do not affect the melting of the glass or the subsequent devitrification that results in the glass-ceramic.

Preferably, the lithium aluminosilicate glass comprises the following constituents within the limits defined below, expressed in percentages by weight:

| | |
|---|---|
| SiO$_2$ | 65-70% |
| Al$_2$O$_3$ | 18-19.8% |
| Li$_2$O | 2.5-3.8% |
| K$_2$O | 0-<1.0% |
| Na$_2$O | 0-<1.0% |
| ZnO | 1.2-2.8% |
| MgO | 0.55-1.5% |
| BaO | 0-1.4% |
| SrO | 0-1.4% |
| TiO$_2$ | 1.8-3.2%. |
| ZrO$_2$ | 1.0-2.5% |

According to one advantageous embodiment, the lithium aluminosilicate glass is colored, especially by the addition of at least one of the following colorants within the limits defined below, expressed in percentages by weight:

| | |
|---|---|
| Fe$_2$O$_3$ | 0-1% |
| NiO | 0-1% |
| Cr$_2$O$_3$ | 0-1% |
| CuO | 0-1% |
| CoO | 0-1% |
| Mn$_3$O$_4$ | 0-1% |
| V$_2$O$_5$ | 0-1%, | and the sum of the percentages of the colorants being at least 0.02%, preferably at least 0.045%, but not exceeding 2%.

The content of the colorant(s) has to be adapted according to the nature and the intensity of the desired color.

V$_2$O$_5$ is the preferred colorant. This makes it possible to provide a glass capable of giving a glass-ceramic that can be used as a cooktop having the particularly desired color, namely one having a black appearance in reflection and a reddish brown tint at the heating elements when the latter are operating.

It turns out that the sulfide used as glass refining agent is capable of reducing the vanadium oxide, which thus passes from the V$^{5+}$ vanadium state to the V$^{4+}$ and the V$^{3+}$ states, one or both of these two forms making it possible to give the glass-ceramic the expected color and to lower its transmission in the visible without correspondingly reducing its transmission in the infrared.

Preferably, the V$_2$O$_5$ content varies from 0.045 to 1%, advantageously from 0.045 to 0.5%, more particularly from 0.045 to 0.2% and better still from 0.06 to 0.15%.

After the refining step, the glass obtained is treated under the usual conditions for producing a glass-ceramic.

Thus, the glass is formed, for example in the form of a ribbon under the conditions of the float process, in which the molten glass floats on a bath of molten tin, and then said ribbon is cut into sheets, or else directly in plate form by rolling, or else molded to the desired shape.

The formed glass then undergoes a heat treatment for the purpose of converting it into a glass-ceramic.

The glass may for example undergo a ceramization cycle comprising the following steps:

a) the temperature is raised to the nucleation range, generally lying close to the conversion range, especially at 50-80° C. per minute;

b) the temperature passes through the nucleation range (670-800° C.) over around 20 minutes;

c) the temperature is raised to the temperature T of the ceramization plateau of between 900 and 1000° C. over 15 to 30 minutes;

d) the temperature T of the ceramization plateau is maintained for a time t of 10 to 25 minutes; and e) the glass is rapidly cooled down to ambient temperature.

However, ceramization at a higher temperature than that indicated above, especially between 1050 and 1200° C., causes the transparent β-quartz crystals to be transformed into β-spodumene crystals which give the glass-ceramic a white color in the absence of any colorant.

The glass-ceramic obtained from the lithium aluminosilicate glass refined under the conditions of the method of the invention and colored by means of at least one of the aforementioned oxides, in particular vanadium oxide, constitutes an object of the invention.

The glass-ceramic is characterized in that it is devoid of arsenic oxide, antimony oxide and tin oxide, in that it contains at least one colorant chosen from Fe$_2$O$_3$, NiO, Cr$_2$O$_3$, CuO, CoO, Mn$_3$O$_4$ and V$_2$O$_5$, and in that it has a light transmission factor (TL$_{D65}$) under illuminant D65 not exceeding 6% and an infrared transmission factor (T$_{IR}$) of greater than 50%, these being measured for a thickness of 3 mm.

The light transmission factor under illuminant D65 is measured according to the standard established by the International Illumination Commission (1931).

The infrared transmission factor is measured under the conditions of the EN410 standard.

Preferably, the T$_{IR}$ factor is greater than 60% and advantageously greater than 65%.

As already indicated, the percentage of each colorant is 1% or less and the sum of the percentages of the colorants does not exceed 2%.

Preferably, the colored glass-ceramic contains 0.045 to 1%, preferably 0.045 to 0.5%, more particularly 0.045 to 0.2% and better still 0.06 to 0.15% by weight of V$_2$O$_5$.

It has been observed that the glass-ceramic containing V$_2$O$_5$ has good aging resistance. This is because the level of light and infrared transmission transmission is maintained after a period of 1000 hours at a temperature of 725° C., which period corresponds to the maximum operating conditions of the glass-ceramic as a cooktop.

Apart from the application in the culinary field, for the production of cooktops and cooking utensils, the colored or colorless glass-ceramic obtained from the lithium aluminosilicate glass under the conditions of the refining method of the invention may be used to produce display windows for heating apparatus, for example stoves or chimney inserts.

The examples that follow enable the invention to be illustrated without however limiting it.

Starting from a mix of conventional glass batch materials, in the form of oxides or other compounds capable of giving oxides by thermal decomposition, glass having the composition given in table 1 below (in percentages by weight) were melted.

Added to the glass batch materials was a refining agent, where appropriate coke, in the amount indicated in table 1.

Placed in a platinum crucible preheated to 1600° C. were 400 g of the aforementioned mix of glass batch materials (height: 40 mm) and this was all introduced into an electric muffle furnace at 1600° C. for 6 hours. After the crucible was cooled down to ambient temperature, a parallel-sided plate 4 mm in thickness was cut from the center of the glass block in the height direction.

The plate was polished on both sides until the thickness of the plate was 3 mm, this plate then being subjected to a ceramization treatment to form a glass-ceramic, this treatment being carried out according to the cycle comprising steps a) to e) described above.

The glass-ceramic plate was subjected to an aging treatment at 725° C. for 1000 hours.

The light transmission factor under illuminant D65 ($TL_{D65}$; CIE (International Illumination Commission) 1931 standard) and the infrared transmission factor ($T_{IR}$; EN 410 standard) were measured before and after aging.

The results were the following:

|  | Ex. 2 (comparative) | Ex. 3 (comparative) | Ex. 6 | Ex. 9 |
|---|---|---|---|---|
| Number of bubbles/cm³ | 900 | 200 | 9 | 20 |

By introducing ZnS into the glass according to the invention (Examples 6 and 9) it was possible to obtain excellent refining quality with fewer bubbles than with $SnO_2$ (Example 2) or $As_2O_3$ (Example 3).

The invention claimed is:

1. A method of refining a lithium aluminosilicate glass, comprising:
(A) adding a sulfide to glass batch materials in an amount of at least 0.05% by weight relative to a total weight of the glass batch materials; and
(B) melting the materials at a temperature below 1750° C.;
wherein
the lithium aluminosilicate glass is free of arsenic oxide, antimony oxide, and tin oxide;
the lithium aluminosilicate glass is a glass comprising constituents below in amounts specified in percentages by weight:

| $SiO_2$ | 52-75% |
|---|---|
| $Al_2O_3$ | 18-27% |
| $Li_2O$ | 2.5-5.5% |

TABLE 1

| | EXAMPLE | | | | | | | | | |
|---|---|---|---|---|---|---|---|---|---|---|
| | 1 (comparative) | 2 (comparative) | 3 (comparative) | 4 | 5 | 6 | 7 | 8 | 9 | 10 |
| $SiO_2$ (%) | 68.8 | 68.8 | 68.8 | 68.8 | 68.8 | 68.8 | 68.8 | 68.8 | 68.8 | 68.8 |
| $Al_2O_3$ (%) | 19.5 | 19.5 | 19.5 | 19.5 | 19.5 | 19.5 | 19.5 | 19.5 | 19.5 | 19.5 |
| $Li_2O$ (%) | 3.5 | 3.5 | 3.5 | 3.5 | 3.5 | 3.5 | 3.5 | 3.5 | 3.5 | 3.5 |
| MgO (%) | 1.2 | 1.2 | 1.2 | 1.2 | 1.2 | 1.2 | 1.2 | 1.2 | 1.2 | 1.2 |
| ZnO (%) | 1.7 | 1.7 | 1.7 | 1.7 | 1.7 | 1.7 | 1.7 | 1.7 | 1.7 | 1.7 |
| $TiO_2$ (%) | 2.7 | 2.7 | 2.7 | 2.7 | 2.7 | 2.7 | 2.7 | 2.7 | 2.7 | 2.7 |
| $ZrO_2$ (%) | 1.7 | 1.7 | 1.7 | 1.7 | 1.7 | 1.7 | 1.7 | 1.7 | 1.7 | 1.7 |
| BaO (%) | 0.8 | 0.8 | 0.8 | 0.8 | 0.8 | 0.8 | 0.8 | 0.8 | 0.8 | 0.8 |
| $V_2O_5$ (%) | 0.08 | 0.08 | 0.22 | 0.08 | 0.08 | 0.04 | 0.11 | 0.11 | 0.08 | 0.08 |
| Refining agent: | none | $SnO_2$ | $As_2O_3$ | ZnS | ZnS | ZnS | ZnS | ZnS | ZnS | ZnS |
| Amount (%) | — | 0.3 | 0.5 | 0.9 | 0.52 | 0.52 | 0.52 | 0.43 | 0.52 | 0.32 |
| Coke (%) | 0.10 | — | — | 0.10 | 0.10 | 0.10 | 0.05 | 0.06 | 0.06 | 0.10 |
| $TL_{D65}$ (%) | | | | | | | | | | |
| Before aging | 18.4 | 2.6 | 2.5 | 5.8 | 0.3 | 0.2 | 0.7 | 0.6 | 1.7 | 2.0 |
| After aging | 27.0 | 3.2 | 0.4 | 4.3 | 0.9 | 1.5 | 0.1 | 0.2 | 2.9 | 4.3 |
| $T_{IR}$ (%) | | | | | | | | | | |
| Before aging | 70.3 | 69.0 | 61.0 | 69.3 | 62.8 | 19.2 | 61.0 | 61.3 | 62.8 | 62.6 |
| After aging | 72.0 | 69.8 | 49.7 | 68.8 | 68.1 | 66.2 | 55.2 | 58.5 | 64.4 | 66.6 |

The glasses of examples 1, 2, 6 and 9 were melted in a fired furnace having a melting area of 0.5 m². The mix of glass batch materials was continuously introduced into the furnace. The average temperature of the glass bath was 1650° C. and the output was 13 kg/hour.

The glass flowing out of the furnace was taken into a steel mold. After cooling, the glass was cut into plates and polished on both main sides until a thickness of 4 mm was obtained. The number of bubbles in the plates was counted using image processing software (depth of field: 5 mm).

-continued

| $K_2O$ | 0-3% |
|---|---|
| $Na_2O$ | 0-3% |
| ZnO | 0-3.5% |
| MgO | 0-3% |
| CaO | 0-2.5% |
| BaO | 0-3.5% |
| SrO | 0-2% |
| $TiO_2$ | 1.2-5.5% |
| $ZrO_2$ | 0-3% |
| $P_2O_5$ | 0-8%. |

2. The method of claim 1, wherein:
the sulfide is added to the glass batch materials; and
the sulfide comprises at least one metal sulfide.

3. The method of claim 2, wherein:
the sulfide is added to the glass batch materials; and
the sulfide is zinc sulfide.

4. The method of claim 1, wherein the temperature is 1700° C. or less.

5. The method of claim 1, wherein the sulfide is added to the glass batch materials in an amount of less than 2% by weight relative to the total weight of the glass batch materials.

6. The method of claim 1, further comprising adding coke or a carbonaceous compound to the glass batch materials.

7. The method of claim 1, wherein the temperature is greater than 1600° C. and less than 1700° C.

8. The method of claim 2, wherein the temperature is greater than 1600° C. and less than 1700° C.

9. The method of claim 1, wherein the lithium aluminosilicate glass is capable of being controllably ceramized.

10. The method of claim 1, wherein the sulfide is added to the glass batch materials in an amount of less than 1% by weight relative to the total weight of the glass batch materials.

11. The method of claim 1, wherein the sulfide is added to the glass batch materials in an amount of between 0.07 and 0.8% by weight relative to the total weight of the glass batch materials.

* * * * *